United States Patent [19]

Schneider

[11] 4,090,291
[45] May 23, 1978

[54] METHOD FOR ENCAPSULATING A CORROSIVE MATERIAL WITH LITHIUM

[75] Inventor: Alan Arthur Schneider, Baltimore, Md.

[73] Assignee: Catalyst Research Corporation, Baltimore, Md.

[21] Appl. No.: 755,256

[22] Filed: Dec. 29, 1976

[51] Int. Cl.² ............................................. H01M 6/00
[52] U.S. Cl. .................................. 29/623.1; 29/623.2
[58] Field of Search ........................... 29/623.1, 623.2; 429/101–110, 191, 218

[56] References Cited

U.S. PATENT DOCUMENTS

| 3,090,263 | 5/1963 | Laverty et al. | 29/422 UX |
| 3,723,183 | 3/1973 | Greatbatch | 429/191 |
| 3,981,744 | 9/1976 | Greatbatch et al. | 29/623.2 X |

Primary Examiner—Carl E. Hall
Attorney, Agent, or Firm—Reed, Smith, Shaw & McClay

[57] ABSTRACT

The invention is addressed to a method for encapsulating a corrosive material with lithium wherein an encasing member having an opening is formed by folding and cold bonding a sheet of lithium into a receiving vessel. The corrosive material is poured into the vessel and the opening is pinched together to form a cold bond. The method is particularly adapted to the manufacture of primary cells where the vessel comprises the anode and the corrosive material is the cathode material.

5 Claims, 20 Drawing Figures

METHOD FOR ENCAPSULATING A CORROSIVE MATERIAL WITH LITHIUM

FIELD OF THE INVENTION

The present invention relates to a method of enclosing a corrosive material and in particular, to the manufacture of lithium-halogen batteries wherein a lithium anode encasing member is coextensively positioned about the cathode material and sealed without freezing the cathode material.

BACKGROUND OF THE INVENTION

Various methods have been used to enclose corrosive materials such as cathode materials or electrolytes with lithium. This is particularly the case in the manufacture of batteries. Primary cells having charge transfer complexes, such as iodine-containing material are generally well known. High energy density batteries utilizing a lithium anode and cathode or organic material such as polycyclic aromatic compounds, organic polymers, heterocyclic nitrogen containing compounds and the like and iodine have been disclosed. U.S. Pat. No. 3,660,163. Additionally, cxthode compositions comprising a mixture of iodine and poly-2-vinylpyridine . $nI_2$ or poly-2-vinylquinoline. $nI_2$, wherein $n = 2-15$ have been taught; U.S. Pat. No. 3,674,562, incorporated herein by reference. Cathode material of this latter type is typically a pliable, plastic-like solid having a flowable viscosity.

Lithium halide batteries of the present invention are typically used with implantable prosthetics such as cardiac pacemakers. For such application, it is necessary that the battery be physically small and highly reliable. To attain high reliability, not only is the design of the battery itself of great importance, but the methods of manufacture can play an extremely important part in achieving high reliability.

Many problems can arise during the manufacture or assembly of primary cells and, in particular, lithium halide cells, including obtaining satisfactory sealing of the depolarizer within the container. In many processes, it is difficult if not impossible to determine whether a battery will leak until it has been completely assembled with its hermetic seal. Failure to provide a leak-proof seal results in the necessity to discard the battery.

To overcome many of the problems that can arise in the manufacture of lithium-halogen batteries, a method has been proposed, U.S. Pat. Application Ser. No. 666,161, filed Mar. 12, 1975, now U.S. Pat. No. 4,010,043, wherein the cell includes a receiving vessel made of lithium which functions as the anode and into which a cathode material is poured in the heated state. A cathode current collector is positioned within the cathode material and the vessel is cooled to a temperature sufficient to solidify the cathode material. The vessel is sealed by positioning a lithium cap on the solidified material and cold welding or diffusion bonding the cap under pressure to the receiving vessel to form a lithium anode encasing member.

Further improvements have been made in such cells which include embedding the cathode lead within the anode encassing member as well as facilitating the manufacturing thereof. See U.S. Patent Application Ser. No. 716,339, filed Aug. 20, 1976, and assigned to the assignee of the present invention.

The present invention incorporates all of the advantages provided in the prior invention and includes as a further object an improved method of fabricating the encasing member so as to eliminate the need to freeze the cathode material. The present invention utilizes a vise to pinch the flaps of the anode encasing member together to form a cold weld. The pinched area is thereafter folded and, while in a die, flattened against the soft cathode material.

While the present invention is especially well suited for use in the manufacture of lithium-halogen batteries, and is therefore described in particularity with respect to such batteries, the invention is also useful in the manufacture of lithium envelopes for encapsulating corrosive materials such as solid depolarizers and electrolytes.

SUMMARY OF THE INVENTION

Pursuant to the present invention, lithium-halide primary cells can be made having any desired length utilizing a single mold. In a preferred method, the cathode and anode leads, respectively, are positioned within the side walls of a lithium anode receiving vessel to minimize any possibility of depolarizer leakage. Generally, a method of the present invention comprises utilizing a mold in which only one end of the battery configuration is defined. Preferable, the defined end includes rounded corners as well as a rounded end portion. Actual assembly of the batteries of the present invention must be carried out in a dry room having a relative humidity of preferably less than 2%.

A substantially rectangular sheet of lithium material is positioned over the half-mold so as to extend beyond the edges of the mold cavity and preferably having a parting sheet interposed therebetween. A cavity conforming half-member having a substantially identical configuration to the hald-mold cavity is positioned over the lihtium sheet and pressed into the mold cavity to conform the lithium sheet to the mold cavity. Positioned on the conforming half-member, while it is positioned in the cavity, is a cathode assembly having rounded edges to conform to the rounded edges of the half-mold. A second half-member is positioned within the cavity overlying said first half-member and the cathode assembly. One side of the lithium blank overlying the mold is folded over the second half-member and the lead from the cathode assembly is bent over the folded side of the lithium blank. The other side of the lithium blank is then folded over both the cathode lead and the first folded blank side. The half-member together with the folded lithium are removed from the half-mold cavity, and the bottom edge of the lithium is trimmed and bent to conform to the rounded corners to form the rough lithium anode receiving vessel. Thereafter, the half-members together with the formed lithium anode receiving vessel positioned thereon are repositioned within the half-mold cavity. While in the mold cavity an anode current collector is bonded to the exterior of the formed lithium receiving member. The completing second half of the mold is attached to the half-mold and half-members are compressed to bond all lithium folds together. The formed lithium receiving vessel is thereafter removed from the mold and x-rayed.

The formed lithium receiving vessel is filled with cathode material heated to a flowable consistency. While in the viscous state, the sides of the vessel defining the opening are pressed together to cold weld them. Thereafter, the pressed sides are folded towards the cathode material. The vessel is placed in a die substantially the same as the mold in configuration and the folded material is pressed against and into the cathode material to coextensively position the folded material, as well as all of the lithium vessel, with the cathode material. The projecting anode and cathode leads are connected to extension leads positioned substantially parallel to and spaced away from the folded lithium top member.

A metal cover having a pair of terminal pins extending therethrough and hermetically sealed therein by means of glass-to-metal seals is positioned substantially parallel to the lithium lid and electrically connected to an associated lead extension. A pair of insulating spacer members are positioned about each of the terminal extenders to maintain the cover in spaced apart relationship from the top of a lithium receiving member.

The primary battery is completed by positioning the cell thus formed within a stainless steel envelope and hermetically sealing the cover to said envelope, preferably by welding. Preferably, the receiving vessel is provided with a fluoroplastic coating or sheathing. The method generally described permits the fabrication of cells in which the cathode lead is positioned within the lithium receiving vessel wall as described in U.S. Patent application Ser. No. 716,339, but without the step of freezing the cathode material. Other advantages of the present invention will become apparent from a perusal of the following detailed description of the presently preferred embodiments taken in connection with the accompanying drawings.

PRESENTLY PREFERRED EMBODIMENT

Figure 1:
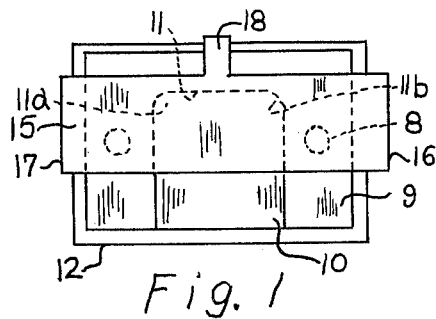
FIG. 1-7 are illustrative representations of preferred method steps for fabricating a lithium receiving vessel.

The following description sets forth presently preferred methods of the invention used in fabricating lithium-halogen primary cells. With reference to FIG. 1, a half-mold 9 is shown including an associated cavity 10 which defines the outer contour of the cells. Cavity 10 includes an end portion 11 which defines the fixed end of a lithium anode receiving vessel. Preferably, fixed end 11 is provided with rounded corners 11a and 11b. Also, it is preferred that the sidewall of cavity 10 be rounded.

The fabrication of each cell is begun by positioning over half-mold 9 and cavity 10 a parting sheet 12, for example of clear transparent polyethylene material, to facilitate removal of the lithium from the mold. Positioned over parting sheet 12 is a thin sheet of lithium, preferably from 0.010 to 0.100 inches in thickness used to form the lithium receiving vessel. Lithium sheet 15 includes first and second sides 16 and 17, respectively, which extend beyond the cavity 10 of mold 9. Each side extends beyond the cavity by an amount at least greater than one-half the width of the cavity. Further, lithium sheet 15 is positioned to extend beyond end 11 of cavity 10 and preferably includes tab extension 18. Sheet 15 may be of any desired length, but as shown it is approximately equal to one-half the length of mold cavity 10. While the length is not critical except as to the desired specifications of the final battery, the length is limited by the length of half-member 22 described below.

Figure 2:
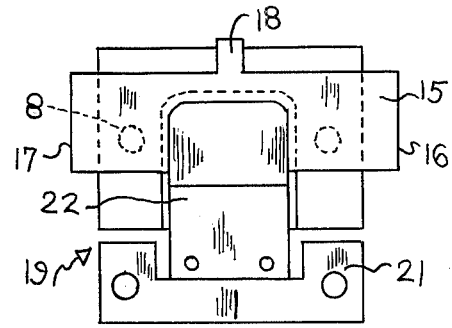

With reference to FIG. 2, second mold part 19 is shown with member 21 and half-member 22 which substantially conforms to cavity 10. Half-member 22 of part 19 is positioned over lithium sheet 15 and pressed into cavity 10 to form sheet 15 with the contour defined by cavity 10. With half-member 22 positioned within the cavity over the lithium, cathode assembly 25 is arranged so as to lie on half-member 22 with the lead projecting over tab 18.

Figure 3:
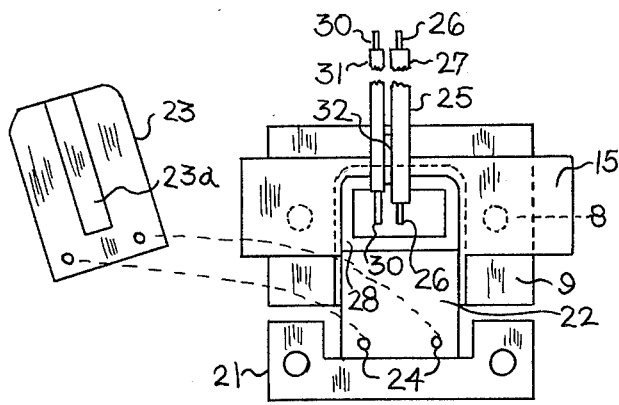

Referring to FIG. 3, cathode assembly 25 comprises a cathode lead 26 encased in plastic sheathing 27. Cathode lead 26 is preferably made from a thin strip of zirconum or platinum. Preferable, sheathing 27 is a fluoroplastic such as Halar. ® Cathode assembly 25 also includes support positioning frame 28 of substantially open rectangular shape having an end configured to conform to end portion 11 of cavity 10. The perimeter of frame 28 is sized to define substantially the inner cross-sectional perimeter of the lithium vessel. Frame 28 is made from a fluoroplastic, such as Halar ® and is attached to cathode lead by means of heat welding or cementing.

Because of the shape and size of frame 28, cathode assembly 25, and in particular cathode lead 26, can be accurately positioned during manufacture of the battery. Preferably, anode lead 30 having a fluoroplastic insulation 31, preferably of Halar ®, is attached to cathode lead insulation 27 by means of attachment 32 such as tape. While not required, the attachment of anode lead 30 to the cathode lead prior to positioning the cathode lead greatly facilitates fabrication of the battery. After cathode assembly 25 has been positioned on first half-member 22, second half-member 23 is aligned and positioned over cathode assembly 25 by means of pins 24. Second half-member 23 includes a recess 23a to accommodate the cathode lead.

Figure 4:
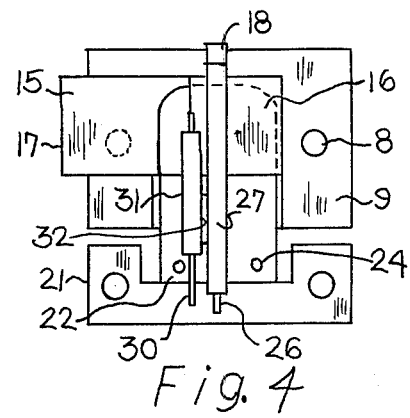

With reference to FIG. 4, side 16 of lithium sheet 15 is folded over second half-member 23. Cathode lead 26 is then bent down and over side 16 and positioned in abuttment therewith. If anode 30 is attached to the cathode lead it too is moved so as to be parallel to cathode 26, but anode 30 is not positioned under fold 16. Thereafter, side 17 is folded over cathode lead 26 and side 16. However, if anode 30 is attached to cathode lead 26, side 17 must be positioned under anode 30 by lifting anode 30 out of the way during the folding operation.

Figures 5, 5A:
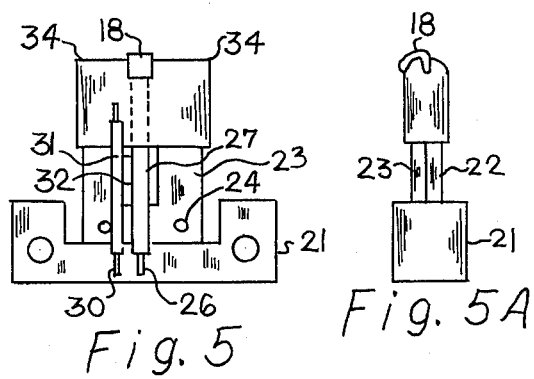

Mold 9 is thereafter removed, as shown in FIG. 5, and the top portion of lithium sheet 15, including tab 18, is compressed about the radius of half-members 22 and 23 as more clearly shown in FIG. 5a. Excess material is preferably trimmed from corners 34 and the edges pressed to substantially conform the lithium to the contours of the half-members.

Figure 6:
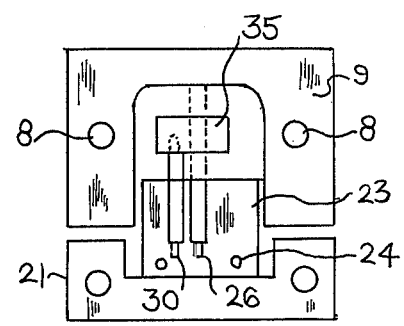
Figure 7:
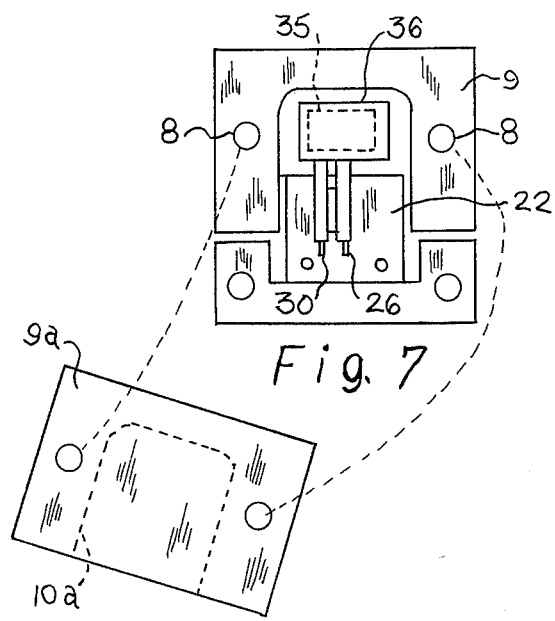

Mold 9 is repositioned as shown in FIG. 6 and a small lithium sheet 35 is cemented to the side of lithium vessel, preferably the same side as that in which the cathode lead 26 is embedded, so as to overlie and contact anode lead 30. Lithium sheet 35 in combination with anode lead 30 comprises the anode current collector for the battery assembly. Preferably, a reinforcing patch of lithium 36 is bonded over patch 35, as shown in FIG. 7, and embeds anode lead 30 within the lithium wall formed by patch 36. Thereafter, the second half 9a of mold 9 having coenforcing cavity 10a is positioned on mold 9 by means of pins 8. Mold 9 and second part 19 are pressed together (ca. 700 psi) so as to cold bond all of the seams. The lithium anode receiving vessel with the cathode assembly is then removed and X-rayed to assure that no unwanted openings exist. The pressure asserted by the molds is sufficient to adequately embed both the cathode and anode leads within the lithium. Most importantly, the cathode lead is embedded in such a manner as to maximize the length of any possible leakage path.

It is important to note that while the use of mold 9 has been shown in process steps illustrated at FIGS. 1–6, it is possible to defer using mold 9 until the final step, FIG. 7, of compressing the lithium receiving vessel. In such cases, the process comprises the utilization of part 19 and in particular, half-members 22 and 23, wherein cathode assembly 25 is positioned between the half-members. After cathode assembly 25 has been positioned between said members as shown in FIG. 3, preferably with anode lead 30 attached to lead 26, the lithium sheet is wrapped around half-members 22 and 23 in the manner similar to that shown in FIG. 4. The steps represented by FIGS. 4–7 and the related description apply to this alternative method. Utilization of mold 9 is thereby deferred until the final step of cold welding the lithium folds.

Figure 8:
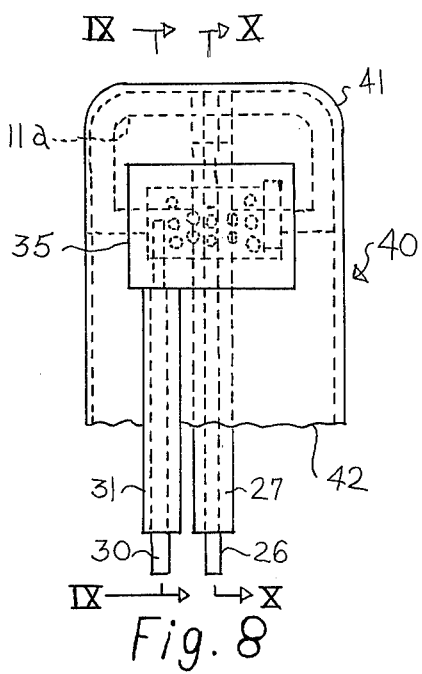
FIG. 8 is an elevation of the completed lithium anode receiving vessel.
Figure 9:
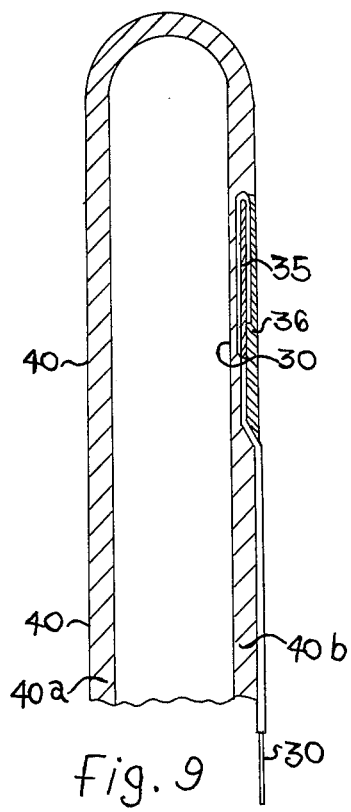
FIGS. 9-10 are sections taken along line IX—IX and X—X of FIG. 8 showing the anode and cathode leads, respectively, embedded within the lithium anode receiving vessel.
Figure 10:
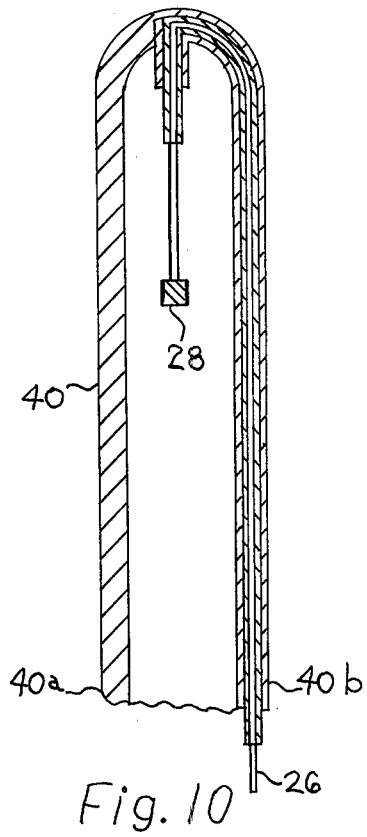

As shown in FIG. 8, completed vessel 40 includes fixed end 41 having a shape defined by end 11 of cavity 10, and open end 42. The length of vessel 40, from end 41 to end 42 is determined by the length of stock sheet 15 used as well as the length of half-members 22 and 23. As can be seen, however, the length of the vessel fromed may be varied greatly within the limits of the half-members, which would include most commerically useful sizes.

Figure 11:
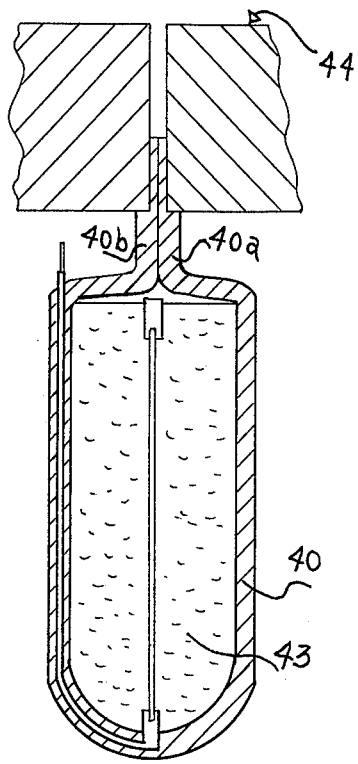
FIGS. 11-13 are illustrative of a method for sealing the viscous cathode-depolarizer material within the receiving vessel.

Referring to FIG. 11, receiving vessel 40 is filled with cathode material 43 through open end 42. Cathode material 43 is a charge-transfer complex of organic material and iodine. Charge-transfer complexes are a well-known class of materials that have two components, one an electron donor, and the other an electron acceptor, that from weakly bonded complexes that exhibit electronic conductivity higher than either component. The charge-transfer complexes are in chemical equilibrium with small amounts of free iodine that is available for electro-chemical reaction. Cathodes containing intimate mixtures of low-conductivity complexes with powdered graphite or inert metal have high conductivities and can provide performance comparable to cells using high-conductivity complexes. Suitable charge complexes may be prepared using an organic donor component such as polycyclic-aromatic compounds, e.g., pyrene, anthracene, and the like; organic polymers, for example, polyehtylene, polypropylene, polyvinyls; or heterocyclic compounds containing nitrogen or sulphur, e.g., phenothiazine, phenazine, and the like. Preferably, the charge transfer complexes comprise a mixture of iodine and solid poly-2-vinyl pyridine · $nI_2$ or poly-2-vinylquinoline · $nI_2$.

The electrolyte, preferably lithium iodine, is formed in situ when the anode and cathode surfaces contact and the lithium reacts with iodine in the cathode to form a solid lithium-iodide electrolyte layer which is in contact with both the anode and the cathode lithium iodide or lithium halide on the lithium anode which coating is formed by reaction of the lithium with iodine or other halogen.

Figure 12:
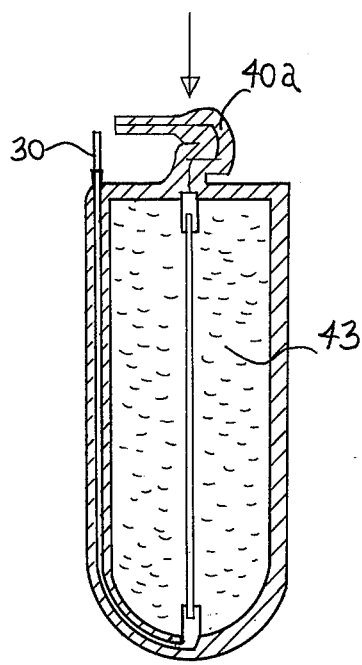
Figure 13:
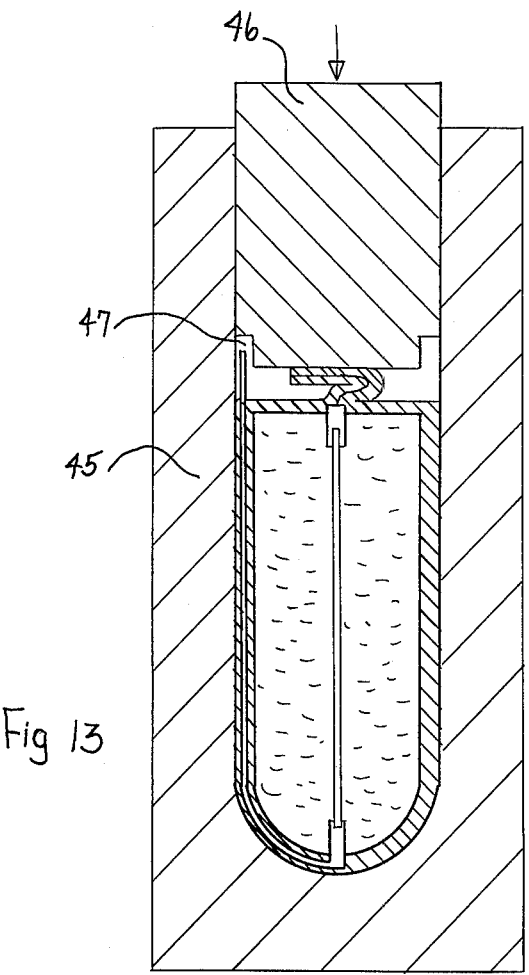

The cathode material is heated to a temperature of between 200° F. and 225° F. to provide a flowable consistency. Receiving vessel 40 is then completely filled with the heated cathode material 43 and the electrolyte is formed in situ. Side walls 40a and 40b, which extend above the level of the cathode material, are pinched together in vise 44 at a pressure of approximately 3000 psi to cold weld opening 42 closed. The pinched walls are thereafter folded as shown in FIG. 12 and the entire assembly is positioned in die 45 and and the top pressed into cathode material 43 by mandrel 46 having pocket 47 to receive anode and cathode leads 26 and 30. Pressing the folded pinched sides into a unified leak-proof assembly which is coextensively positioned with and against the cathode material 43. This assembly is then preferably encased in a film, ca. 0.005 to 0.015 inches, of fluoroplastic such as Halar ® or Teflon ®. This film acts both as an electrical insulator and as an addition seal against cathode or depolarizer leakage.

Figure 14:
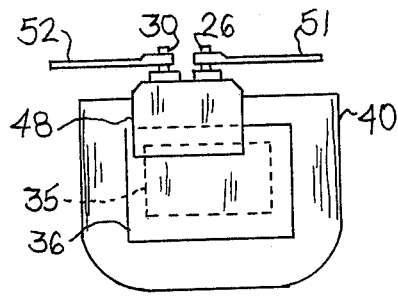
FIG. 14 is an elevation of the receiving vessel with lead extensions connected to the cathode and anode leads.
Figure 15:
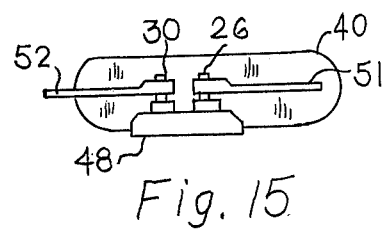
FIG. 15 is a plan view of the receiving vessel shown in FIG. 14 with the lead members bent 90°.
Figure 16:
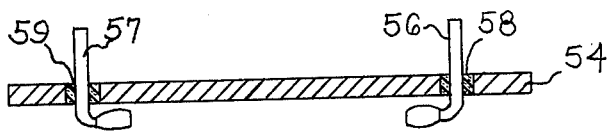
FIG. 16 is a sectional elevation of a cover member showing the terminal pins hermetically sealed therein.
Figure 17:
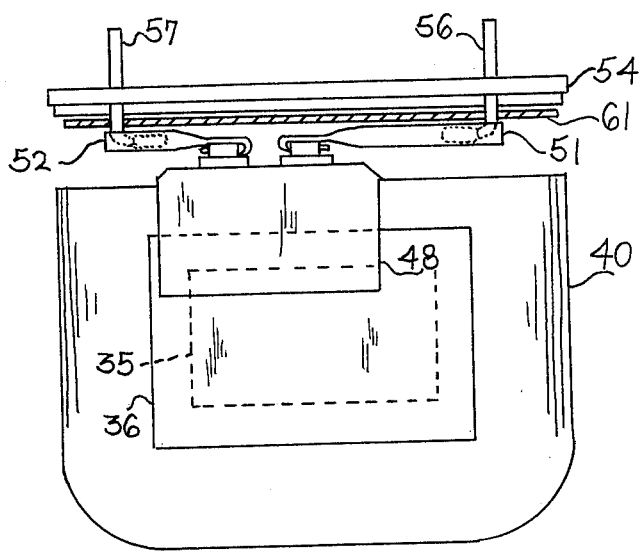
FIG. 17 is an enlarged elevation of the receiving vessel and cover plate with the terminals and anode and cathode leads electrically connected thereto.
Figure 18:
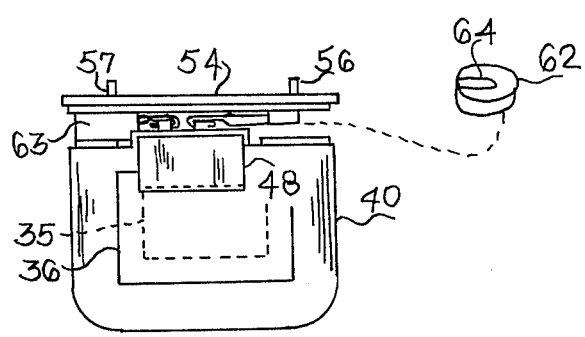
FIGS. 18 and 19 are elevations showing the positioning of a spacer member between the cover and receiving vessel and the insertion of the receiving vessel into an outer stainless steel case, respectively.
Figure 19:
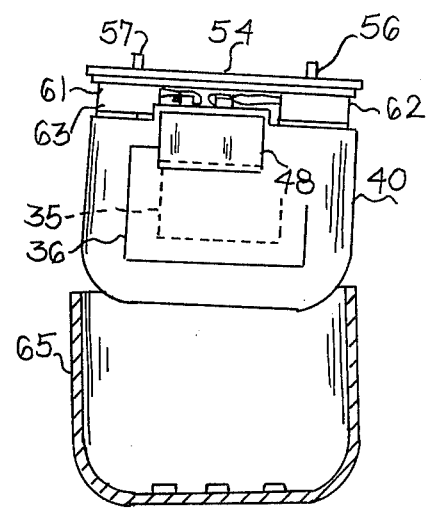

With reference to FIG. 14, a Halar ® reinforcing member 48 is cemented to vessel 40 and anode and cathode lead 26 and 30, respectively. Lead extensions 51 and 52 are welded to cathode lead 26 and anode lead 30, respectively. As can be seen from FIG. 14, lead extensions 51 and 52 are preferably spaced above and parallel to lid 44. Reinforcing member 48 and leads 26 and 30 are then bent at a 90° angle to position the lead extensions substantially in the center of vessel as shown in FIG. 15. A cover plate 54 including terminal pins 56 and 57 is positioned above lid 44. Terminal pins 56 and 57 extend through cover 54 and are securely positioned and sealed therein by means of glass seals 58 and 59, respectively. Cathode and anode leads are bent at a 90° angle and their respective extension leads welded to pins 56 and 57, respectively, as shown in FIG. 17. As insulator plate 61 e.g., 0.003 inch mica, is positioned between the bottom cover 54 and extension 51 and 52. Cylindrical spacer members 62 and 63 are positioned between insulator 61 and lid 44 of vessel 40. As shown in FIG. 18, each spacer member is preferably made from a ceramic material and include a slot 64 which encompasses the respective extension lead and associated terminal pin. Spacers 62 and 63 are cemented to the top of lid 44 and the bottom of insulator member 61 as shown in FIG. 18.

The assembly as shown in FIG. 18 is positioned within outer case member 65, preferably made of stainless steel. The assembly provides a substantially compression fit, but is secured with cement. Once interted within the case, the outer peripheral edge of case 65 is welded to top cover 54 to provide a hermetic seal for the entire battery assembly.

While presently preferred embodiments of the invention have been shown and described, it may be otherwise embodied within the scope of the appended claims.

What is claimed is:

1. A method for making lithium-halide cells comprising the steps of:
   A. forming a lithium anode receiving vessel having a cathode lead embedded within the vessel by
      (i) folding a lithium sheet in the form of said vessel,
      (ii) positioning a cathode lead having insulation thereon within said vessel such that one end is within the vessel and extends between at least two folds of the lithium,
      (iii) pressing the folds together to embed the cathode therebetween and to form a vessel having an open end and
      (iv) attaching an anode to the exterior of the vessel;
   B. heating a cathode material to a flowable consistency; and
   C. filling said vessel less than full with said cathode material and pinching together the lithium vessel sides extending above the unfilled portion of the vessel to effect a cold weld and thereafter folding said pinched area into the cathode material to position said pinched fold area in coextensive contact with the cathode material.

2. A method as set forth in claim 1 wherein the sides of the vessel are pinched together at a pressure of about 3000 psi.

3. A method of encapsulating a cathode material within a lithium anode of a primary cell, said method comprising the steps of:
   A. forming a lithium anode receiving vessel by folding a lithium sheet into the desired form having an opening therein, positioning a cathode having a lead within the vessel thus formed and embedding said lead within a fold of the vessel and cold bonding the folds, and
   B. pouring the cathode material into the formed vessel through the opening to a level below the periphery of the opening and pinching together the periphery of the opening above the material level to achieve a cold weld and thereafter folding the pinched area into the material.

4. A method as set forth in claim 2 wherein said cathode material is a charge transfer complex.

5. A method as set forth in claim 4 wherein said charge transfer complex comprises an organic donor component and a halogen.

* * * * *